(12) United States Patent
Farmer et al.

(10) Patent No.: US 6,481,684 B1
(45) Date of Patent: Nov. 19, 2002

(54) MOUNTING PLATE FOR MOBILE COMMUNICATION DEVICES

(75) Inventors: David B. Farmer, Edina, MN (US); Edward Kirtland Briggs, Edina, MN (US)

(73) Assignee: Good-to-Go Products, Inc., Minneapolis, MN (US)

( * ) Notice: Subject to any disclaimer, the term of this patent is extended or adjusted under 35 U.S.C. 154(b) by 0 days.

(21) Appl. No.: 09/627,553

(22) Filed: Jul. 28, 2000

Related U.S. Application Data

(60) Provisional application No. 60/146,007, filed on Jul. 28, 1999, and provisional application No. 60/146,005, filed on Jul. 28, 1999.

(51) Int. Cl.[7] .............................................. F16B 47/00
(52) U.S. Cl. .............................. 248/309.3; 248/225.11; 248/309.4
(58) Field of Search ........................... 248/309.3, 309.4, 248/229.11, 229.17, 314, 230.6, 292.12, 206.3, 206.5, 225.11; 224/274, 271, 270, 930, 197, 547

(56) References Cited

U.S. PATENT DOCUMENTS

| 3,734,439 | A | * | 5/1973 | Wintz .......................... 248/314 |
| 5,622,296 | A | * | 4/1997 | Pirhonen et al. ............ 224/197 |
| 5,678,793 | A | | 10/1997 | Hill |
| 5,873,486 | A | * | 2/1999 | Morgan .................... 248/206.5 |
| 6,092,772 | A | * | 7/2000 | Garcia et al. ............ 248/205.5 |
| 6,206,257 | B1 | * | 3/2001 | Peele et al. ................ 224/197 |

FOREIGN PATENT DOCUMENTS

| DE | 298 07 598 U 1 | 7/1998 |
| WO | WO 99/49584 | 9/1999 |

* cited by examiner

Primary Examiner—Korie Chan
Assistant Examiner—Gwendolyn Baxter
(74) Attorney, Agent, or Firm—Fredrikson & Byron

(57) ABSTRACT

A mounting plate and assembly for a universal clip or other protrusion, for use with a mobile communication device, comprising recesses at the top of the plate, for centering the belt clip or other element of the portable personal communication device and for providing lateral and rotational hold of various devices. A mounting structure for securing the plate to a handlebar, railing, window, or other non-porous surface, as well as to metal surfaces, is also provided.

23 Claims, 4 Drawing Sheets

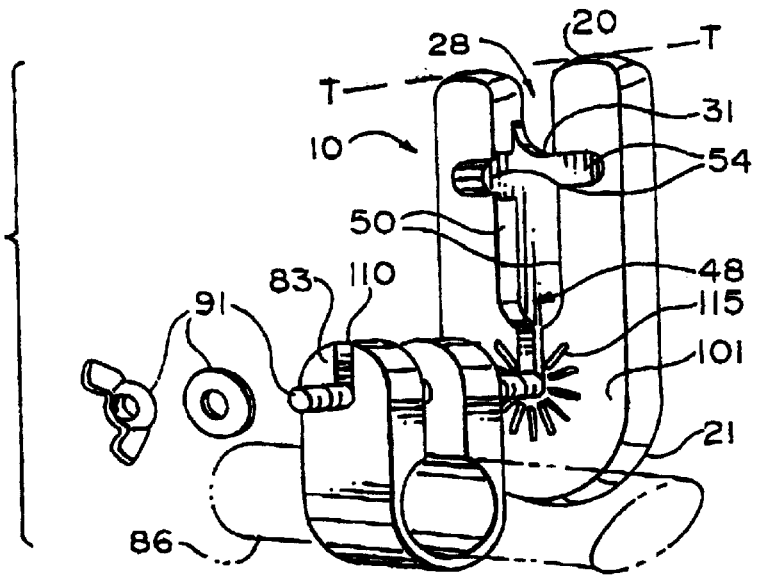
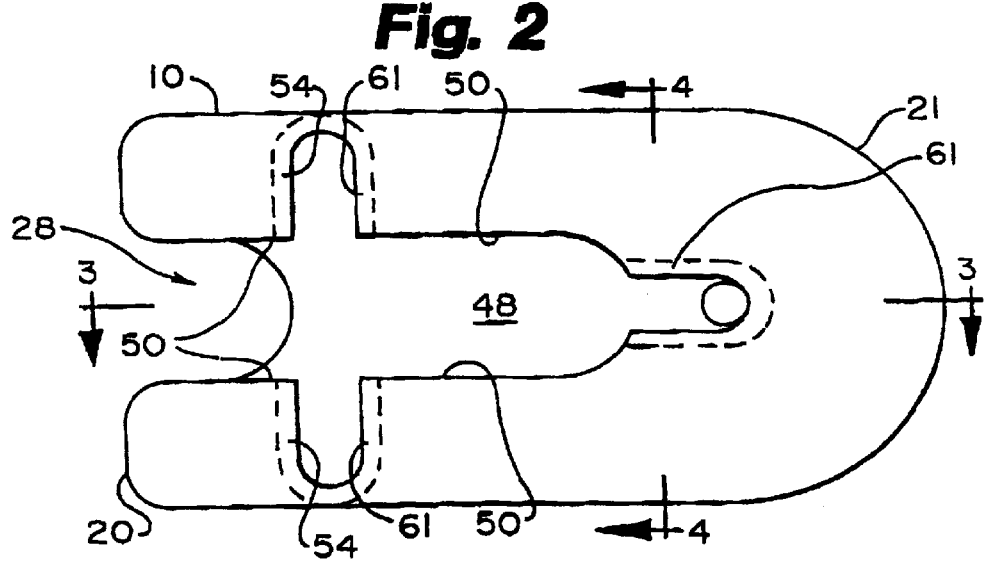
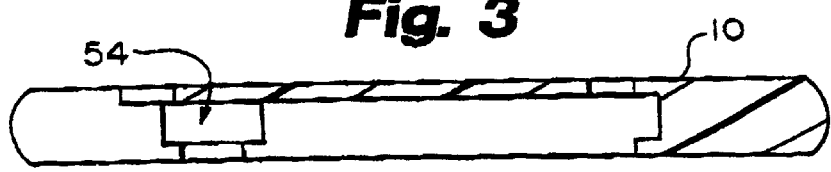

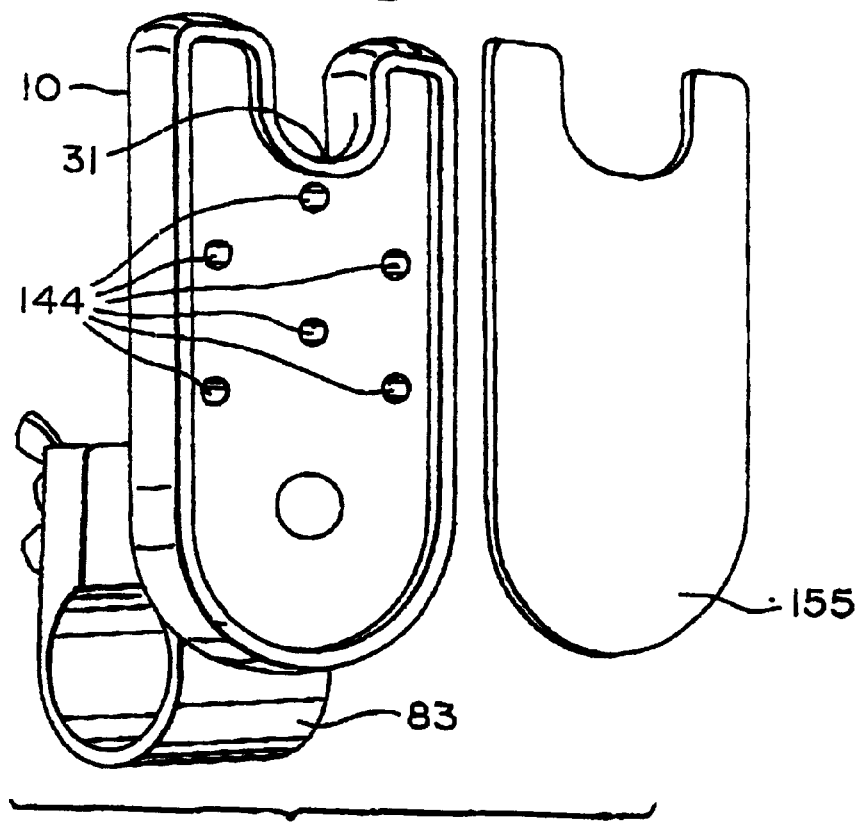
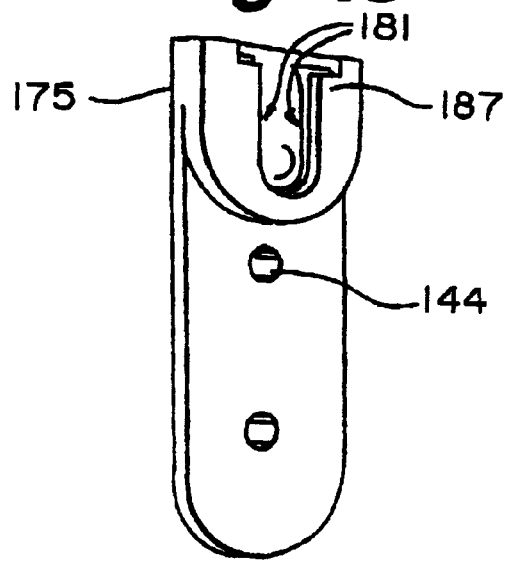

MOUNTING PLATE FOR MOBILE COMMUNICATION DEVICES

This application claims the benefit of provisional application Nos. 60/146,007, and 60/146,007, both filed Jul. 28, 1999.

FIELD OF THE INVENTION

The invention relates to a device for holding portable communication devices in a convenient manner to the user.

BACKGROUND OF THE INVENTION

In recent years, portable personal communication devices (PPCDs) have become more popular; allowing the user to communicate with others while driving or performing other activities, such as riding a bicycle or boating, etc. However, PPCDs are hand-held devices which are inconvenient for many occasions. Mounting devices have been developed in order to overcome these problems. One example includes a conventional mounting device for a mobile telephone, as disclosed in published U.S. Pat. No. 5,503,313. In this reference, the mounting device comprises a belt assembly, a swivel assembly, and a telephone holder assembly. With this mounting device, the driver can mount his mobile telephone on his shoulder, thereby freeing both hands for driving. As is appreciated, a shoulder-mounted telephone has many inconveniences. Accordingly, an improved system and method for holding PPCDs while in use is needed.

SUMMARY OF THE INVENTION

The present invention provides a clip-mount plate which is capable of holding, displaying and permitting a PPCD to be used in a fixed position on various mounting substrates. Recesses are provided to the top and rear of the plate for centering belt clips of a portable personal communication device and providing lateral and rotational hold of variously manufactured products. Various fastening methods and structures are provided to affix the plate to other objects.

BRIEF DESCRIPTION OF THE DRAWINGS

FIG. 1 is a rear perspective exploded assembly view of the invention and mounting assembly.

FIG. 2 is a rear plan view of the invention.

FIG. 3 is a section view of the mounting plate of the invention taken along lines 3—3 of FIG. 2.

FIG. 9 is a front perspective view of the invention with a representative frontplate.

FIG. 10 is a front perspective view of an insert for use with the mounting plate.

DETAILED DESCRIPTION OF THE PREFERRED EMBODIMENTS

Figure 4:
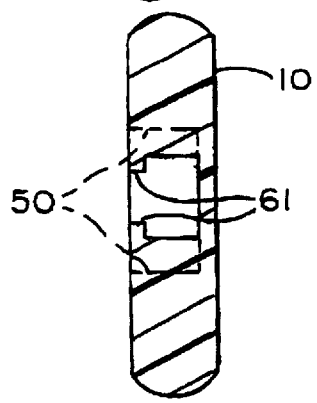
FIG. 4 is a section view of the mounting plate of the invention taken along lines 4—4 of FIG. 2.

As shown in FIG. 1, mounting plate 10, according to the present invention, comprises upper portion 20 and lower portion 21. Upper portion 20 is designed to receive a clip or other element from a portable personal communication device (PPCD) and thereby retain the PPCD in a desired position and location. Upper portion 20 is designed to facilitate receipt of such a clip or element (referred to herein as "clip" for ease of reference) through use of top recess 28 which is designed for centering and holding the PPCD. Top recess 28 is formed by surface 31 which extends in curved fashion below a plane T—T along the top of plate 10. Rear recess 48 is configured for allowing the PPCD clip to slide onto the mounting plate and prevent the PPCD device from rotating by engagement with walls 50. T-slots 54 are provided for holding mounting means such as, for example in one embodiment, suction cups or the like which are inserted into them to facilitate a more stable and tight mounting. Using this embodiment, top recess 28 is shaped so that, when a mobile device which contains a clip is held onto plate 10, the PPCD is mounted in a very stable, non-wobbling manner, with considerable ease of use.

Figure 5:
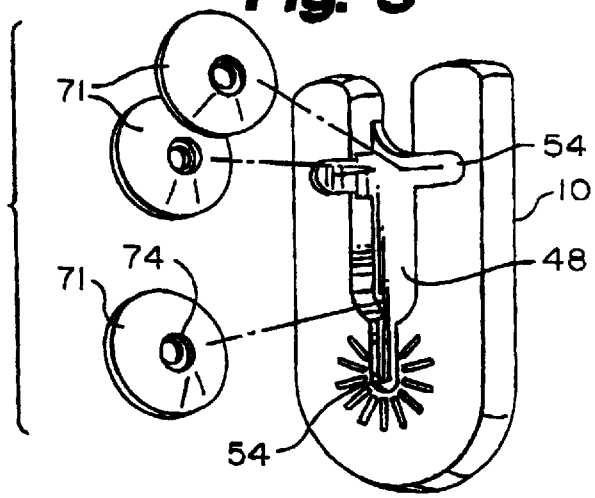
FIG. 5 is a rear perspective exploded assembly view of the invention and mounting assembly.
Figure 13:
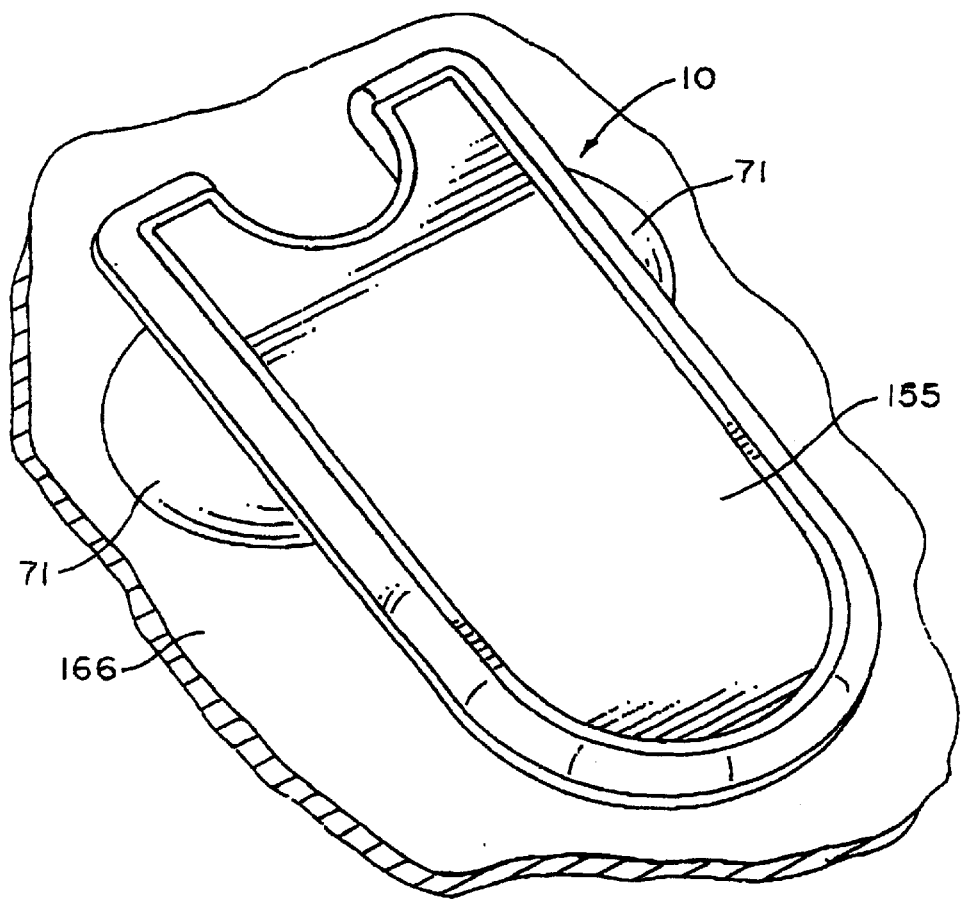
FIG. 13 is a front perspective view of the invention affixed to a surface.

FIGS. 2, 3, and 4 show a rear plan view, a side section view, and an end section view respectively of the mounting plate 10 according to one embodiment of the present invention. These views also show the engaging lip 61 structure of mounting plate 10. Engaging lip 61 is configured to allow various mounting means attachment and removal with ease. For example, as shown in FIG. 5, one or more suction cups 71 may be inserted into the T-slots, and cup rear mounting protrusion 74 is sized for snug fit (for example by use of an annular space and disk configuration) within T-slot and retained therein by engaging lip 61 or similar structure. This allows mounting plate 10 to be mounted onto various surfaces, including nonporous surfaces, by the suction cups. The particular configuration of three suction cups shown in FIG. 5 makes the plate more stable than with only one or two cups. In addition, the suction cups are very easy to remove from a non-porous surface when use of the device is not desired. In addition, suction cups are very easy to remove from a non-porous surface when use of the device is not desired. FIG. 13 shows a mounting plate 10 mounted to surface 166 via suction cups 71.

Figure 11:
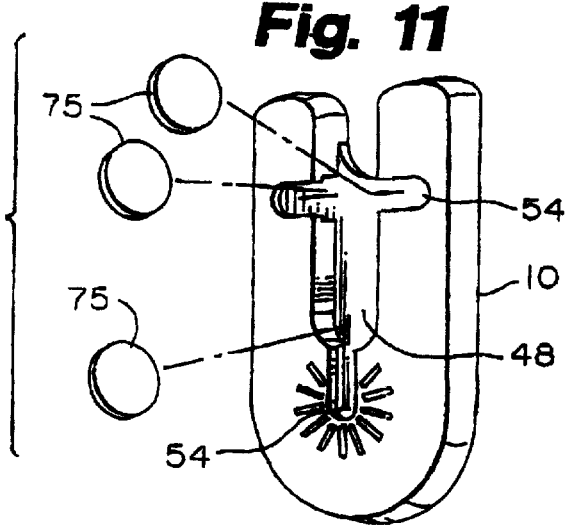
FIG. 11 is a rear perspective exploded assembly view of the invention and mounting assembly.

Alternatively, with respect to FIG. 11, mounting may be accomplished by inserting one or more magnets 75 in snug partial engagement in the T-slots in order to facilitate affixing the PPCD to a metal surface. It is recognized that the term T-slot may include a plurality of shapes not matching a T shape per se, however the objective is to allow for enough engaging contact which is properly distributed to achieve immobility when used in an active or mobile environment.

Figure 6:
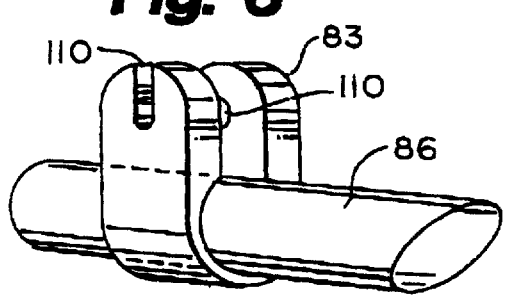
FIG. 6 is a perspective view of the collar of the invention wrapped around a portion of a mountable tubular structure.
Figure 7:
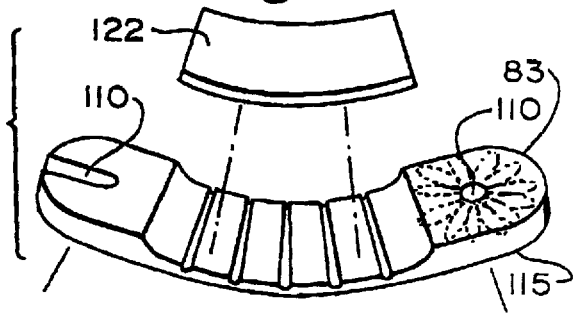
FIG. 7 is a top view of a collar and sizing shim of the invention.

FIGS. 1, 6, 7, 8, and 9 also show views of a shaft collar 83 according to another embodiment of the mounting means of the present invention. In this embodiment, shaft collar 83 comprises an optional resilient material, such as a rubber-lined shaft collar, which is sized to fit the handlebar 86 or other structure having shapes suitable for collared or wrap-around type of attachment. Representative attaching means also may include a fastener, such as fastening assembly 91 (having a bolt, an optional external flat washer, and a wing nut or similar assembly lock) designed for passing through a face 101 of mounting plate 10, and the two bosses 110 of the shaft collar- and which is then secured with wing nut or the like to provide frictional resistance to rotation. In the embodiment of FIGS. 1, 6 and 7, anti-rotation means is further provided by integrated male-female dentitions 115 on face 101 of mounting plate 10 and the adjacent or facing surface of collar 83. It is recognized that other means for retaining the collar are contemplated within the scope of the invention. In addition, it is possible to adjust the clamping ability of the collar to accommodate various structures through selective use of a pliant or resilient shim 122, used in cooperation with collar 83, such as for radius adjustment.

Figure 8:
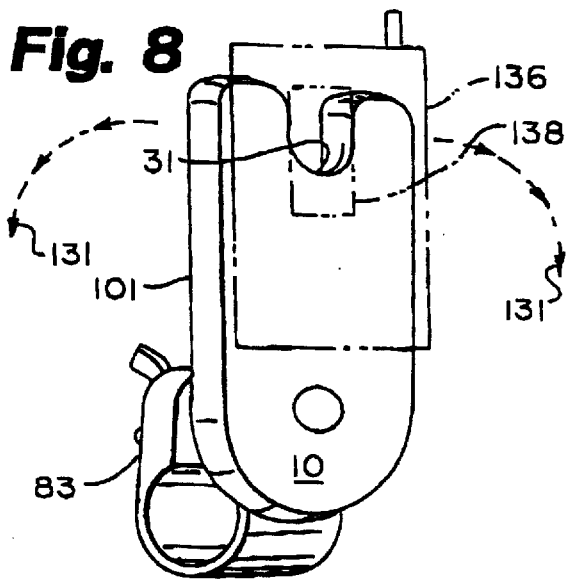
FIG. 8 is a front perspective view of the invention with a representative portable personal communication device mounted thereto.
Figure 12:
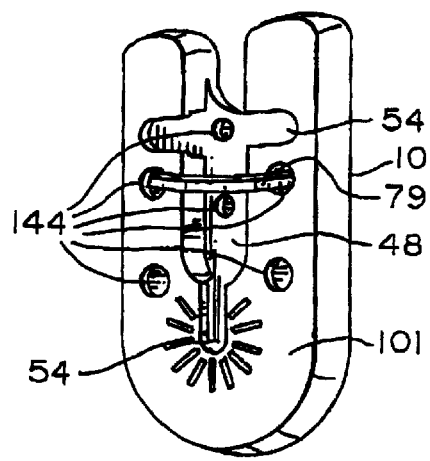
FIG. 12 is a rear perspective view of the mounting plate with resilient cord.

FIG. 8 illustrates with motion arrows 131 how mounting plate 10 may be guided to a particular angle relative to a mountable structure and prior to tightening collar 83 until dentitions 115 are in locking engagement, augmented by the additional frictional locking effect of the collar itself. A representative PPCD 136 is shown in transparent view mounted on surface 31 with clip 138. A resilient cord 79 may also be releasably attached to a portion of either the mounting plate face 101, the collar 83, or the fastening assembly 91. FIG. 12 shows the resilient cord 79 attached to a portion of mounting plate face 101. The cord may then be place over and under the PPCD which is on the mounting plate, secure to another of the above mentioned portions, and thus retained against further motion. This may be quite helpful to protect against vertical movement of a mounted PPCD under extremely rough travel conditions.

FIG. 9 illustrates yet another means for attaching mounting plate 10 or similar plates for holding a PPCD onto an underlying mobile structure. In this embodiment, mounting plate 10 has a plurality of vias or through-holes defined by walls 144. These vias allow mounting of the plate onto a standard bracket designed to receive mountable devices such as car phone cradles or similar structures. Such vias also allow more permanent attachment of plate 10 to any substrate, i.e. more permanent relative to the embodiments shown utilizing a removable collar.

FIG. 9 also discloses optional and replaceable frontplate 155. This component may be assembled with mounting plate 10 in various manners, either by snapfit or other means. However, when frontplate 155 is manufactured of a resilient material, such as a rubber (e.g., a neoprene or sanoprene type of inlay material) then the mounting plate receives additional attributes of anti-rotation of the PPCD due to surface friction with the inlay or frontplate and additional shock absorbency during rough operations. Another benefit of frontplate 155 is the labeling or logo option which may be placed on the article thereby promoting certain brands or for personal preference.

According to the above description, the mounting plate of the present invention can use an existing belt clip of portable personal communication devices to hold, display and permit their use in a fixed position on a handlebar, railing, window, or other non-porous surface, as well as smooth metal surfaces. Indeed, it is also possible to incorporate a cartridge or other modular insert in cooperation with upper portion 20, rear recess 48, and other portions, such as T-slots 54 or merely onto surface 31 to accommodate variously sized and shaped, including non-standard or customized, belt clips or other fasteners. FIG. 10 shows one embodiment of insert 175 designed to be slidably inserted into rear recess 48 and attached to surface 31, similar to the manner of attachment of a PPCD belt clip onto surface 31 but on the opposite side of the plate. Insert 175 allows connection of a ball or swivel member of a PPCD to then be attached to receiving slot 181 having engaging lip 187 or similar retaining means. Many types of PPCDs have a swivel component to allow greater user comfort when wearing the PPCD on a belt when seated or walking. Accordingly, insert 175 readily accommodates such a feature when desired, while preserving the benefits of the invention.

The invention being thus described, it will be apparent that the same may be varied in many ways. It should also be noted that the PPCD of the present invention includes portable cellular telephone, pagers, family radio service transmitter/receivers, general mobile radio service, and other "walkie-talkie" or wireless type devices. Such variations are not to be regarded as a departure from the spirit and scope of the invention, and all such modifications as would be obvious to one skilled in the art are intended to be included within the scope of the following claims.

What is claimed is:

1. A mounting plate for holding a portable personal communication device having a clip or other element protruding therefrom, comprising:
a plate having an upper portion, top and rear recesses designed to receive the clip from the portable personal communication device, a lower portion, a front surface, a back surface, and a T-slot, the T-slots and recess includes a plurality of engaging lip structures thereabout, the engaging lip structures being configured to allow attachment and removal of various mounting means, wherein the top recess centers and holds the device and the rear recess is shaped to provide lateral and rotational stability to the clip or other element when a portable personal communication devices is mounted on the plate.

2. A mounting plate for holding a portable personal communication device having a clip or other element protruding therefrom, comprising:
a plate having a front surface, a back surface bearing a T-slot and rear recess, the rear recess being configured to generally match the shape of the clip or other element of the portable personal communication device, an upper portion bearing a top recess with a surface of curvilinear design, a lower portion, and a plurality of engaging lip structures about the T-slot and rear recess, the engaging lip structures being configured to allow attachment and removal of various mounting means, wherein the top recess and rear recess cooperate to receive and retain the clip or other element and to provide lateral, vertical and rotational stability to the clip or other element of a portable personal communication device mounted on the plate.

3. A mounting plate for holding a portable personal communication device having a clip or other element protruding therefrom, comprising:
a plate having a front surface, a back surface, an upper portion, a lower portion, a U-shaped top recess in the front surface of the upper portion, a rear recess and a T-slot in the back surface of the upper portion, the rear recess being configured to generally match the shape of the clip or other element of the portable personal communication device and having walls for engagement of the clip or other element, and a plurality of engaging lip structures about the T-slot and rear recess the engaging lip structures being configured to allow attachment and removal of various mounting means, wherein the top recess and rear recess cooperate to retain the clip or other element of the portable personal communication device mounted on the plate and to provide lateral, vertical and rotational stability to the clip or other element.

4. A mounting plate according to any one of claims 1–3, further comprising a mounting means for securing the plate to a surface in fixed position.

5. A mounting plate according to any one of claims 1–3, further comprising a mounting means for securing the plate to a surface in fixed position, wherein the surface is a handlebar, railing, window, smooth metal surface, or other non-porous surface.

6. A mounting plate according to any one of claims 1–3, wherein the back surface further includes a plurality of surfaces defining slots for holding a mounting means.

7. A mounting plate according to any one of claims 1–3, further comprising a mounting means for securing the late to a surface in fixed position, wherein the mounting means is at least one suction cup, at least one magnet or a shaft collar sized to fit and mount to tubular shaped material.

8. A mounting plate according any one of claims 1–3, wherein tile plate is provided with a plurality of vias or through-holes.

9. A mounting plate according any one of claims 1–3, further comprising a resilient cord to protect against vertical movement of the portable personal communication device when mounted on the plate.

10. A mounting plate according any one of claims 1–3, further comprising a resilient cord to protect against vertical movement of the portable personal communication device when mounted on the plate, wherein the resilient cord is releasably attached to the plate.

11. A mounting plate according any one of claims 1–3, further comprising a plurality of vias or through-holes and a resilient cord to protect against vertical movement of the portable personal communication device when mounted on the plate, the resilient cord being attached to the plate through at least one of the vias or through-holes.

12. A mounting plate according any one of claims 1–3, wherein the plate further comprises a plurality of vias or through-holes to permit mounting of the plate onto standard brackets designed to receive mountable devices.

13. A mounting plate according any one of claims 1–3, further comprising a frontplate which is removable and replaceable.

14. A mounting plate according to any one of claims 1–3, further comprising a removable and replaceable front plate, wherein the front plate is manufactured of a resilient material.

15. A mounting plate according to any one of claims 1–3, wherein the plate can receive and retain portable personal communication devices having non-standard clips of various shapes and sizes.

16. A mounting plate according to any one of claims 1–3, wherein the plate has a plurality of male or female dentitions.

17. A mounting plate for holding the clip or other protrusion of a portable personal communication device, comprising:

a plate having a front surface, a back surface, an upper portion and a lower portion;

a top recess located in the upper portion of the plate, the top recess having a surface of curvilinear design;

a rear recess extending from the top recess along the back surface of the plate, the rear recess being configured to generally match the shape of the clip or other protrusion of the device and to cooperate with the top recess to provide lateral, vertical and rotational stability to the clip or other protrusion when a portable personal communication devices is mounted on the plate;

a plurality of slots in the back surface of the plate for receiving and holding mounting means;

a plurality of male or female dentitions on the back surface located around one of the slots;

a plurality of vias or through-holes to allow mounting of the plate; and a mounting means for securing the plate to a surface.

18. A mounting plate for holding a portable personal communication device having a clip or other element protruding therefrom, comprising:

a plate having an upper portion, top and rear recesses designed to receive the clip from the portable personal communication device, a lower portion, a front surface, a back surface, a T-slot and an insert designed to be slidably inserted into the rear recess of the plate, the insert having a receiving slot with engaging lips or similar retaining means for receiving and retaining engaging structures of the portable personal communication device, wherein the top recess centers and holds the device and the rear recess is shaped to provide lateral and rotational stability to the clip or other element when a portable personal communication devices is mounted on the plate.

19. A mounting plate for holding a portable personal communication device having a clip or other element protruding therefrom, comprising:

a plate having a front surface, a back surface bearing a T-slot and a rear recess, the rear recess being configured to generally match the shape of the clip or other element, an upper portion bearing a top recess with a surface of curvilinear design, a lower portion, and an insert designed to be slidably inserted into the rear recess of the plate, the insert having a receiving slot with engaging lips or similar retaining means for receiving and retaining engaging structures of the portable personal communication device, wherein the top recess and rear recess cooperate to receive and retain the clip or other element and to provide lateral, vertical and rotational stability to the clip or other element of the portable personal communication device mounted on the plate.

20. A mounting plate for holding a portable personal communication device having a clip or other element protruding therefrom, comprising:

a plate having a front surface, a back surface, an upper portion, a lower portion, a U-shaped top recess in the front surface of the upper portion, a rear recess in the back surface of the upper portion, the rear recess and a T-slot being configured to generally match the shape of the clip or other element and having walls for engagement of the clip or other element, and an insert designed to be slidably inserted into the rear recess of the plate, the insert having a receiving slot with engaging lips or similar retaining means for receiving and retaining engaging structures of the portable personal communication device, wherein the top recess and rear recess cooperate to retain the clip or other element of the portable personal communication device mounted on the plate and to provide lateral, vertical and rotational stability to the clip or other element.

21. A mounting plate according to any one of claims 18–20, wherein the insert is slidably inserted into the rear recess of the plate.

22. A mounting plate according to any one of claims 18–20, wherein the insert can accommodate a swivel member of a portable personal communication device.

23. A mounting plate according to any one of claims 18–20, wherein he insert can receive and retain non-standard clips of various sizes and shapes.

* * * * *

UNITED STATES PATENT AND TRADEMARK OFFICE
CERTIFICATE OF CORRECTION

PATENT NO. : 6,481,684 B1
DATED : November 19, 2002
INVENTOR(S) : Farmer et al.

It is certified that error appears in the above-identified patent and that said Letters Patent is hereby corrected as shown below:

Column 4,
Line 23, change "T-slot, the T-slots" to -- T-slot, the T-slot --

Column 5,
Line 12, change "securing the late to" to -- securing the plate to --.

Signed and Sealed this

Twenty-ninth Day of April, 2003

JAMES E. ROGAN
*Director of the United States Patent and Trademark Office*